2,825,738

PROCESS FOR THE MANUFACTURE OF TEREPHTHALIC ACID DIMETHYL ESTER

Günther Ellendt, Krefeld, and Hermann Schnell, Krefeld-Uerdingen, Germany, assignors to Farbenfabriken Bayer Aktiengesellschaft, Leverkusen, Germany, a corporation of Germany No Drawing. Application October 24, 1955
Serial No. 542,486

Claims priority, application Germany October 26, 1954

7 Claims. (Cl. 260—475)

The invention relates to a process for the manufacture of terephthalic acid dimethyl ester and particularly to an improved esterification of terephthalic acid with methanol at elevated temperatures and pressures.

The usual process for the manufacture of terephthalic acid dimethyl ester, an important intermediate product for the synthesis of polyesters, consists in the esterification of terephthalic acid with methanol at elevated temperatures and pressures and/or with the addition of esterification catalysts, for example sulphuric acid, and, if desired, in the presence of inert solvents incapable of dissolving the terephthalic acid, such as for example o-phthalic acid diesters. In order to obtain good yields in sufficiently brief reaction times, especially in a continuous working method, and to ensure the continuous working up of the reaction mixture, with terephthalic acid diester which is sparingly soluble in methanol, a substantial excess of anhydrous liquid or gaseous methanol is generally employed. Thus, at least about 10 parts by volume of methanol are used per 1 part by weight of terephthalic acid.

This process has the disadvantage of having a small yield per unit of space and time in addition to the fact that the excess methanol is diluted by water freed in esterification so that relatively great quantities of methanol must be dehydrated before being re-used for esterification; furthermore, substantial amounts of ester dissolve in the large quantities of cold methanol, which require a special working up before re-using the methanol. Finally, the terephthalic acid dimethyl ester obtained by this process is not sufficiently pure so that it must generally be recrystallised. Processes where acid esterification catalysts are applied have also the drawback that the reaction mixtures have a very strong corrosive action at the elevated temperatures required. Last but not least, it is very difficult, or impossible, to obtain reaction products pure enough to satisfy the extremely high requirements for the manufacture of high molecular weight polyesters.

It has now been found that it is possible to improve the process for the manufacture of terephthalic acid dimethyl ester prepared by esterification of terephthalic acid with methanol at temperatures from about 180° to about 260° C. and pressures from about 20 to about 110 atmospheres by adding to the esterification mixture an aromatic hydrocarbon, liquid at room temperature, and having a boiling point of below 250° C. at atmospheric pressure.

Suitable aromatic hydrocarbons of the mentioned group are for instance benzene, toluene, ethyl benzene, cumol, amyl benzene, heptyl benzene, xylenes, diethyl benzenes, diisopropyl benzenes, methylethyl benzenes, methyl cumols, trimethyl benzenes, triethyl benzenes, ethyl xylenes, diethyl toluenes, tetramethyl benzenes, tetraethyl benzenes and trimethylethyl benzenes. Among these hydrocarbons the xylenes are preferred.

Since the esterification is carried out in a closed vessel, the process according to the invention is not related to the known application of entraining agents in esterification where the reaction water is aezotropically distilled off. It is therefore surprising that under the same reaction conditions, i. e. at the same pressure, temperature and time of reaction, greater yields in terephthalic acid diester are obtained if a portion, e. g. ⅓ to ⅔ of the quantity of methanol hitherto employed, is replaced by an appropriate part by volume of an aromatic hydrocarbon. Thus, when adding about 7–3.5 parts by volume of hydrocarbon, only about 3 to 6.5 parts by volume of methanol are required per 1 part by weight of terephthalic acid.

The process according to the present invention can be carried out with great advantage by using not more than one third to one fifth of the quantity of methanol hitherto used and in addition only about the same volume of an aromatic hydrocarbon so that the whole space required is not more than half that hitherto required. Although in this case the yield in terephthalic acid diester is not greater than the one obtained by the hitherto known process, the yield per unit of space and time is at least twice as great and, therefore, not more than one third to one fifth of the usual quantity of methanol need be worked up for re-use. Thus, only about 2 to 3 parts by volume of methanol and about 3 to 2 parts by volume of hydrocarbon are required per 1 part by weight of terephthalic acid.

A further advantage of the process according to the present invention consists in the simple working up of the reaction mixture which may be carried out, for example, as follows:

The mixture is first subjected to a methanol vapour distillation whereby the unreacted solid acid is separated out. The acid-free vapour mixture is then condensed and the condensate cooled whereby the crude terephthalic acid diester is crystallised out. It is purified in the usual manner by recrystallisation, e. g. from xylene. The mother liquor separates in two layers, one of which consists of the bulk of aromatic hydrocarbon and little aqueous methanol, and the other of the bulk of methanol and the bulk of the reaction water. The layer of hydrocarbon is separated and freed from methanol and from moisture by washing with water. The hydrocarbon thus purified can be re-used for further esterification. The methanol layer is freed from water by fractional distillation. The methanol can also be re-used for esterification.

By a special method of working up the vapour mixture freed from the unreacted terephthalic acid, it is also possible to obtain the terephthalic acid dimethyl ester directly and in a very pure state so that re-crystallisation is generally unnecessary. For this purpose, the vapour mixture consisting of terephthalic acid dimethyl ester, methanol and hydrocarbon is passed through a column so that a mixture of methanol and water can be drawn off from the head of the column, whilst in the sump a hot solution of terephthalic acid dimethyl ester and hydrocarbon is obtained which can be worked up directly to the pure ester after washing with soda solution.

EXAMPLE

*Esterification*

(A) A suspension of 100 parts by weight of terephthalic acid in 1,000 parts by volume of methanol is continuously injected at a speed of 20 litres per hour into a pressure tube heated to 245° C. and having a capacity of about 70 litres at a pressure of 90 atmospheres. The esterified mixture is continuously withdrawn at the other end of the tube. The yield in terephthalic acid dimethyl ester is 90 percent.

(B) A suspension of 100 parts by weight of terephthalic acid in 500 parts by volume of methanol and 500 parts by volume of xylene are treated in the same way as described under A. The yield in terephthalic acid dimethyl ester is 94 percent.

(C) A suspension of 100 parts by weight of terephthalic acid in 250 parts by volume of methanol and 250 parts by volume of xylene is treated in the same way as described under A. The yield in terephthalic acid dimethyl ester is 89 percent.

In experiment B (process according to the present invention) the total volume is the same, the consumption of methanol, however, only half and the yield greater than that of experiment A (known process). In experiment C (process according to the invention) the total volume is only half and the consumption of methanol only one quarter of that used in the experiment A (conventional process), the yield being practically the same.

*Working up*

The reaction mixture of experiment B being continuously withdrawn at the end of the pressure tube and released evaporates at 180° C. The vapour mixture is passed through a separator where the solid unreacted terephthalic acid is separated from the vapours. The vapour mixture is then introduced into the centre of a vertical column. The upper part of the column is maintained at a temperature of 65° C. so that a condensate consisting of methanol, water and some xylene can be continuously withdrawn from the head of the column. At the bottom of the column a hot solution of the terephthalic acid dimethyl ester in xylene is continuously obtained. It is washed with a hot aqueous alkaline solution and then cooled. The pure terephthalic acid dimethyl ester thereby crystallises out. After filtering and drying the ester has an acid value of less than 0.03 and a melting point of 140.6° C. The yield is 90 percent of the theoretical. The xylene mother liquor, in which about 4 percent of diester is still dissolved, is re-cycled for esterification. The mixture of methanol and water withdrawn at the head of the column is subjected to fractional distillation, and the anhydrous methanol thus recovered is also re-cycled for esterification.

We claim:

1. Process for the manufacture of terephthalic acid dimethyl ester which comprises esterifying terephthalic acid with methanol at temperatures from about 180° to about 260° C. and pressures from about 20 to about 110 atmospheres in the presence of an aromatic hydrocarbon, liquid at room temperature, and having a boiling point of below 250° C. at atmospheric pressure, the initial reaction mixture containing 10 volumes of combined methanol and aromatic hydrocarbon for each 1–2 parts by weight of terephthalic acid, each 10 volumes of combined methanol and aromatic hydrocarbon including from about 3.5 to about 7 volumes of aromatic hydrocarbon.

2. Process according to claim 1 wherein the hydrocarbon is xylene.

3. Process according to claim 1 wherein per 1 part by weight of terephthalic acid from 3 to 6.5 parts by volume of methanol and from 7 to 3.5 parts by volume of the aromatic hydrocarbon are used.

4. Process according to claim 1 wherein per 1 part by weight of terephthalic acid from 2 to 3 parts by volume of methanol and from 3 to 2 parts by volume of the aromatic hydrocarbon are used.

5. Process according to claim 1 wherein the esterification mixture is evaporated, the unreacted solid terephthalic acid is separated from the vapour mixture and the vapour mixture is condensed in a vertical column to obtain at the head of the column mainly methanol and water, and at the bottom of the column a hot solution of the terephthalic acid dimethyl ester in hydrocarbon.

6. Process for the manufacture of terephthalic acid dimethyl ester which comprises continuously injecting a suspension of 100 parts by weight of terephthalic acid in 500 parts by volume of methanol and 500 parts by volume of xylene into a pressure tube heated to 245° C. at a pressure of 90 atmospheres, continuously withdrawing the mixture at the other end of the tube while releasing the pressure and evaporating the mixture at 180° C., passing the vapour mixture through a separator where the solid unreacted terephthalic acid is separated from the vapours, introducing the vapour mixture into the centre of a vertical volumn, the upper part of which is maintained at a temperature of 65° C. so that a condensate consisting of methanol, water and some xylene can be continuously withdrawn from the head of the column and continuously withdrawing at the bottom of the column a hot solution of the terephthalic acid dimethyl ester in xylene, washing this solution with a hot aqueous alkaline solution, cooling the solution and separating the crystallised terephthalic dimethyl ester.

7. Process for the manufacture of terephthalic acid dimethyl ester which comprises continuously injecting a suspension of 100 parts by weight of terephthalic acid in 250 parts by volume of methanol and 250 parts by volume of xylene into a pressure tube heated to 245° C. at a pressure of 90 atmospheres, continuously withdrawing the mixture at the other end of the tube while releasing the pressure and evaporating the mixture at 180° C., passing the vapour mixture through a separator where the solid unreacted terephthalic acid is separated from the vapours, introducing the vapour mixture into the centre of a vertical column, the upper part of which is maintained at a temperature of 65° C. so that a condensate consisting of methanol, water and some exylene can be continuously withdrawn from the head of the column and continuously withdrawing at the bottom of the column a hot solution of the terephthalic acid dimethyl ester in xylene, washing this solution with a hot aqueous alkaline solution, cooling the solution and separating the crystallised terephthalic dimethyl ester.

References Cited in the file of this patent

UNITED STATES PATENTS

| | | |
|---|---|---|
| 1,732,392 | Wietzel | Oct. 22, 1929 |
| 2,091,241 | Kvalnes | Aug. 24, 1937 |
| 2,459,014 | Cavanaugh et al. | Jan. 11, 1949 |
| 2,578,312 | Miller et al. | Dec. 11, 1951 |